(12) United States Patent
Raghavan et al.

(10) Patent No.: US 8,041,691 B2
(45) Date of Patent: Oct. 18, 2011

(54) ACQUIRING LOCKS IN WAIT MODE IN A DEADLOCK FREE MANNER

(75) Inventors: Ananth Raghavan, San Francisco, CA (US); Shrikanth Shankar, San Francisco, CA (US); Ramesh Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 11/830,528

(22) Filed: Jul. 30, 2007

(65) Prior Publication Data

US 2009/0037416 A1 Feb. 5, 2009

(51) Int. Cl.
*G06F 7/00* (2006.01)
(52) U.S. Cl. ...................................................... 707/704
(58) Field of Classification Search .......... 707/702–704; 711/200
See application file for complete search history.

(56) References Cited

U.S. PATENT DOCUMENTS

| | | | | |
|---|---|---|---|---|
| 5,872,981 | A * | 2/1999 | Waddington et al. | 710/200 |
| 6,105,026 | A * | 8/2000 | Kruglikov et al. | 707/8 |
| 6,353,828 | B1 * | 3/2002 | Ganesh et al. | 1/1 |
| 6,370,529 | B1 * | 4/2002 | Kruglikov et al. | 707/704 |
| 6,772,155 | B1 * | 8/2004 | Stegelmann | 707/8 |
| 2006/0212496 | A1 * | 9/2006 | Romine et al. | 707/204 |
| 2007/0094431 | A1 * | 4/2007 | Fachan | 710/200 |

OTHER PUBLICATIONS

Cyran et. al. "Oracle® Database Concepts, 10g Release 2 (10.2)" [Online] Oct. 2005, Oracle, [Retrevied on Sep. 23, 2009]. Retreived from Internet: <URL: http://download.oracle.com/docs/cd/B19306_01/server.102/b14220.pdf> 65 selected pages.*
"Stumblings >> Locking in Oracle—DML Locks" [Online], Mar. 27, 2006, [archived by Archive.org May 7, 2006], [retreived on Sep. 23, 2009]. Retreived from the Internet: <URL:http://web.archive.org/web/20060507094455/http://rahulagarwal.wordpress.com/2006/03/27/locking-in-oracle-dml-locks/>, 4 Pages.*
"Deadlocks" downloaded from the Internet Sep. 4, 2007 <http://publib.boulder.ibm.com/infocenter/cldscp10/index.jsp?topic=/com.ibm.cloudscape.doc/develop75.htm >.
"Lock Table" downloaded from the Internet Sep. 4, 2007 <http://oracle-docs.dartmouth.edu/dba-docs/10gdoc/server.101/b10759/statements_9015.htm#sthref7012>.

* cited by examiner

*Primary Examiner* — John R. Cottingham
*Assistant Examiner* — James E Richardson
(74) *Attorney, Agent, or Firm* — Hickman Palermo Truong & Becker LLP; Christian A. Nicholes; Daniel D. Ledesma

(57) ABSTRACT

Techniques for a data definition language (DDL) statement acquiring a lock on a table in wait mode in a deadlock free manner are provided. A DDL statement specifies metadata of a table that is to be modified, whereas a data manipulation language (DML) statement specifies a table to be modified. When a DDL statement is received, a proxy statement is initiated and executed instead of first acquiring an exclusive lock on metadata of a particular table. The proxy statement is similar to a DML statement in that the proxy statement acquires a lock on the particular table. After the proxy statement has been processed, an exclusive lock on the metadata is acquired.

18 Claims, 2 Drawing Sheets

US 8,041,691 B2

ACQUIRING LOCKS IN WAIT MODE IN A DEADLOCK FREE MANNER

FIELD OF THE INVENTION

The present invention relates generally to database systems and, more particularly, to acquiring locks in wait mode in a deadlock free manner.

BACKGROUND

In database systems, many resources (such as data blocks, tables, indexes) are shared among multiple processes. Even though resources may be shared, many resources may not be used by more than one process at a given time. For example, sometimes, tables stored on a storage medium may be concurrently accessed in some ways (e.g., read) by multiple processes, but accessed in other ways (e.g., written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks from being granted on the same resource.

When multiples processes require multiple locks on different resource simultaneously, a deadlock situation may arise. Generally, a deadlock occurs when two or more processes are each waiting for another process to release a resource. For example, process A might hold a lock on resource A', and process B might hold a lock on resource B'. Process A might request, on resource B', a lock that is incompatible with the current lock on resource B'. Two locks are incompatible with respect to each other if one lock on a resource prevents a process from acquiring the other lock on the resource. Similarly, process B requests a lock on resource A' that is incompatible with the current lock on resource A'. Under these circumstances, if process A and process B are "willing" to wait indefinitely for the current locks to be released, then process A and process B are said to be deadlocked with respect to each other.

According to one approach, a process is configured to abort and return an error if the process requests, on a resource, a lock that is incompatible with a current lock on the resource. In high traffic database systems, however, returning errors causes delays and, as a result, users experiences to suffer. It may be important to ensure that most (if not all) database transactions are processed without noticeable delays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
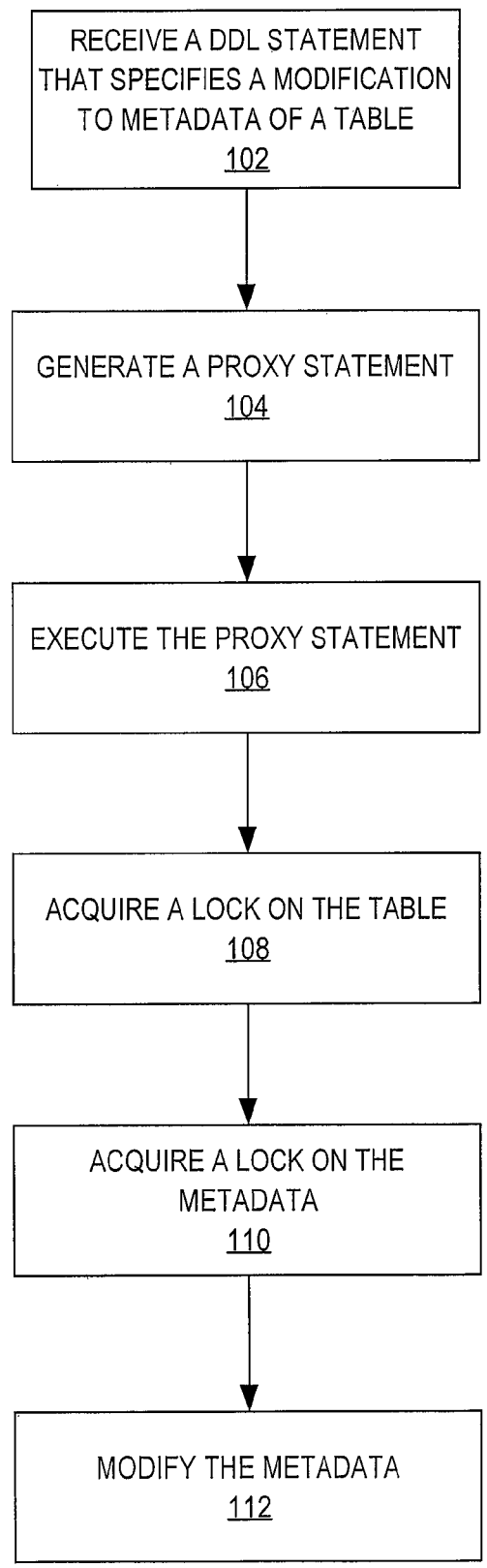
FIG. 1 is a flow diagram that illustrates how a DDL statement may be processed, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for processing DDL statements. In response to the receipt of a DDL statement, a proxy statement is generated. The proxy statement acts like a DML statement by acquiring locks on the metadata and the database object in the same order as "normal" DML statements. After the proxy statement acquires the lock on the database object, then the DDL statement acquires a lock on the metadata. As a result, the DDL statement may acquire the lock on the database object in a wait mode while avoiding deadlocks with concurrently executing DML statements.

Types of Locks

There are numerous types of locks that may be granted with respect to a particular resource. One type of lock is a shared (S) lock. An S lock on a table grants a process permission to read the table and guarantees that other processes cannot write to the table; however, the S lock does not guarantee that other processes cannot read the table.

Another type of lock is an exclusive (X) lock. An X lock on a table grants a process permission to read from and write to a table and guarantees that other processes cannot read from or write to the table.

Another type of lock is a shared-exclusive (SX) lock. An SX lock on a table grants multiple processes permission to read from and write to the table, but prevents S locks and X locks from being granted on the table. A common scenario in which a SX lock is used is when multiple processes are affecting different rows of the same table.

Types of Database Statements

There are at least two types of database statements which, when executed, require locks on certain database objects: data manipulation language (DML) statements and data definition language (DDL) statements. Non-limiting examples of DML statements include INSERT, UPDATE, and DELETE. Non-limiting examples of DDL statements include CREATE, DROP, and ALTER. DML statements modify entries (e.g., rows) in tables and indexes while DDL statements define a table or index, such as by adding a column or dropping a partition.

Multiple DML statements are usually included in a single database transaction. The processing of a database statement typically entails parsing (or compiling) the database statement and then executing the database statement. One or more processes that parse and/or execute a database statement acquire locks while the database statement is processed.

Although a database transaction is simply a transaction and, thus, does not perform any function in and of itself, the discussion hereinafter says, for purposes of brevity, that a database transaction (or a database statement) performs some function relative to a lock. For example, "a database transaction acquires a lock" is shorthand for "one or more processes that process a database transaction acquire a lock." Similarly, "a database statement acquires a lock" is shorthand for "one or more processes that process a DML statement acquire a lock."

Although techniques described herein may be applied to varying types of database objects, the following examples are provided in the context of updates to tables and the metadata associated with those tables.

DML Statement Acquiring Locks

Typically, while processing a DML statement in a database transaction, at least two locks are acquired. First, the DML statement acquires an S lock on metadata of a table. Typically, a table's metadata is stored separately from the table. A table's metadata includes information about the table, such as the column names of the table and the data type of each column. The S lock on a table's metadata (referred to hereinafter as a "metadata S lock") is used when obtaining access to the metadata—for example, to determine if the update operation specified in the DML statement is even possible or if an index may be used to execute the DML statement. For example, if the DML statement specifies an INSERT operation on table T1 where the employee ID is "123," but table T1 does not include an employee ID column, then the INSERT operation is not performed, and a subsequent lock on table T1 is unnecessary.

After the metadata lock is acquired, the DML statement acquires an X lock on the table (referred to hereinafter as a "table X lock"). A DML statement may acquire a table X lock, for example, if it is determined, based on the metadata, that the DML statement can be executed. Alternatively, a DML statement may acquire a table SX lock (i.e., a table-level lock in SX mode) and an X lock on the row(s) of the table that are to be modified.

Typically, once a database transaction acquires a metadata S lock, the metadata (or at least a portion thereof) is saved away and then the database transaction releases the metadata S lock before acquiring a table X lock. A database transaction typically holds a table X lock for the duration of the database transaction. Many times, a subsequent DML statement in the same database transaction will affect the same table. Under these circumstances, the subsequent DML statement acquires a metadata S lock, releases the metadata S lock, and then requests a table lock (either in SX or X mode). Because the table lock is already held by the database transaction, the subsequent DML statement does not need to wait for the table lock. Thus, a database transaction that includes multiple DML statements may hold a table lock while requesting a metadata lock but will never hold a metadata lock while requesting a table lock.

DDL Statements Acquiring Locks

DDL statements are similar to DML statements in that DDL statements also require metadata locks and table locks at the same time. However, one difference is that a DDL statement within a database transaction is usually the only database statement in the transaction. Another difference is that some DDL statements acquire metadata locks and table locks in a different order than the order in which a database transaction that includes multiple DML statements may acquire locks. For example, such DDL statements might first acquire a metadata X lock and then, while still holding the metadata X lock, acquire a table X lock. This different ordering, in many instances, may result in a deadlock.

Deadlock

As referred to above, a deadlock generally occurs when two or more processes are each waiting for another process to release a resource. An example of a deadlock situation in the context of DDL statements and DML statements is illustrated in Table 1 below.

TABLE 1

| EXMLE DEADLOCK SCENARIO | | |
|---|---|---|
| TIME | FIRST (DDL) TRANSACTION | SECOND (DML) TRANSACTION |
| 1 | metadata X lock | table X lock |
| 2 | request table X lock | |
| 3 | | request metadata S lock |

At time 1, a first database transaction, which includes a DDL statement, holds a metadata X lock while a second database transaction, which includes multiple DML statements, holds a table X lock. (References to "first" and "second" do not necessarily indicate that one database transaction was issued or is processed before or after another database transaction.) At time 2, the first database transaction requests a table lock that is incompatible with the lock that the second database transaction current holds on the table. At time 3, the second database transaction requests a metadata lock that is incompatible with the lock that the first database transaction current holds on the metadata.

If both database transactions will "wait" until the resource they are requesting is no longer locked, then both database transactions will wait indefinitely. Both database transactions are said to be deadlocked.

Wait Modes

There are at least two modes in which a lock may be requested—"wait" mode and "no wait" mode. "No wait" mode indicates that a database statement will not wait for an incompatible lock held by another database statement to be released. Instead, the database statement will abort and return an error or restart (i.e., by being parsed and executed again).

"Wait" mode indicates that a database transaction will wait (indefinitely) until another database transaction that currently holds an incompatible lock releases the lock. A variation of the wait mode involves a database transaction waiting for a finite period of time (e.g., 3 seconds) before returning an error and/or restarting.

Avoiding Deadlocks

One approach to avoiding this deadlock situation is to require DDL statements to acquire locks in a "no wait" mode. However, returning an error to the user that submitted the DDL statement results in a poor user experience. Furthermore, in database systems that experience heavy user traffic, acquiring table locks in a "no wait" mode is nearly impossible because hundreds of DML statements may be constantly requesting (and acquiring) table locks on a subject table so that those DML statements may update the subject table.

Under another approach to avoiding this deadlock in database systems that experience heavy user traffic, whenever a DDL statement is issued, all subsequent database statements are buffered and all pending DML statements are allowed to finish executing. After the last DML statement is finished executing, the DDL statement is executed. After the DDL statement is executed, then the buffered DML statements (which might have remained buffered for a long time) are finally executed. However, such a draconian measure also results in poor user experiences for those users whose DML statements were buffered.

Another approach to avoiding this deadlock situation involves the DDL statement releasing the metadata X lock, acquiring a table X lock, and then re-acquiring a metadata X lock. However, this approach does not work for various reasons. For example, another database transaction might have dropped a column of the table (or even the table itself) between the time that the metadata X lock was released and the time that the metadata X lock was re-acquired. In other words, if something of interest changed to the metadata within these two instances, then the DDL statement might need to be processed again. Determining whether something of interest has changed within these two instances is not trivial—in fact, such a determination may be computationally expensive and, thus, resource intensive. The problem of determining and/or tracking the changes that occurred to the metadata between these two instances is referred to as the "window problem." The resources needed to account for the "window problem" are many times not worth the benefit achieved.

DML statements also have to account for the "window problem" which, for DML statements, occurs between the time that the metadata S lock is released and the time that table X lock is acquired. However, the "window problem" for DML statements is already accounted for and requires fewer resources to solve.

Proxy Statement

According to an embodiment of the invention, in response to the receipt of a database transaction that includes a DDL statement, a proxy statement is generated and executed instead of first acquiring a lock on the metadata of a particular table. A proxy statement acts as a DML statement in that execution of the proxy statement may first cause the database transaction to acquire a lock on the metadata, release the metadata lock, and then acquire a lock on the particular table. The lock on the metadata may be an S lock, whereas the lock on the particular table may be an X lock. Thus, a proxy statement may be thought of as a lock statement that does not modify the data (or metadata) of a database object, such as a table or an index.

After the proxy statement is executed (in which the table lock is acquired), the database transaction acquires an X lock on the metadata. In this way, the request for the table lock may be in wait mode and a deadlock is avoided. Table 2 illustrates an example of how a deadlock is avoided.

TABLE 2

EXAMPLE OF DEADLOCK AVOIDANCE SCENARIO

| TIME | FIRST (DML) TRANSACTION | SECOND (DDL) TRANSACTION |
| --- | --- | --- |
| 1 | table X lock | initiate proxy statement |
| 2 | release table X lock | |
| 3 | | acquire table lock |
| 4 | | acquire metadata X lock |

According to Table 2, at time 1, a first database transaction (which includes multiple DML statements) holds a table X lock on a particular table. Also at time 1, a second database transaction, which includes a DDL statement, has been submitted, e.g., by a user. As a result, a database server process initiates a proxy statement. The proxy statement blocks (i.e., waits) because the proxy statement is unable to acquire a table lock on the particular table. At time 2, the first database transaction releases the table X lock (e.g., after the first database transaction commits). At time 3, the proxy statement is now able to acquire the table lock. At time 4, the DDL statement executes and is able to acquire a metadata X lock on the metadata of the particular table.

FIG. 1 is a flow diagram that illustrates how a DDL statement may be processed, according to an embodiment of the invention. At step 102, a database server receives a DDL statement, e.g., from an administrator. The DDL statement specifies a change to metadata of a table. At step 104, the database server generates a proxy statement based on the DDL statement. At step 106, the database server executes the proxy statement. At step 108, as a result of executing the proxy statement, the proxy statement acquires a lock on the table. At step 110, the database server executes the DDL statement, which acquires a lock on the metadata. At step 112, as a result of executing the DDL statement, the metadata is modified, as specified in the DDL statement.

In one embodiment, after the proxy statement is executed, the processing of the DDL statement is "normal" in that the DDL statement acquires a metadata X lock, followed by a request for a table X lock. However, because the proxy statement already acquired the table lock before the DDL statement requested the table lock, the DDL statement does not need to wait for other database transactions to release the table lock.

Some DDL statements require a table X lock, while other DDL statements only require a table S lock. Thus, in one embodiment, for those DDL statements that do not require a table X lock, a proxy statement acquires a table S lock.

One advantage of using a proxy statement to acquire a table lock before the DDL statement acquires a metadata X lock is that the code for executing DDL statements does not need to change beyond additionally calling a proxy statement. Existing functionality (i.e., acquiring locks in a DML statement-like behavior) may be used.

Using a proxy statement also advantageously allows DDL statements to complete without having to account for the DDL statement "window problem" discussed above.

Hardware Overview

Figure 2:
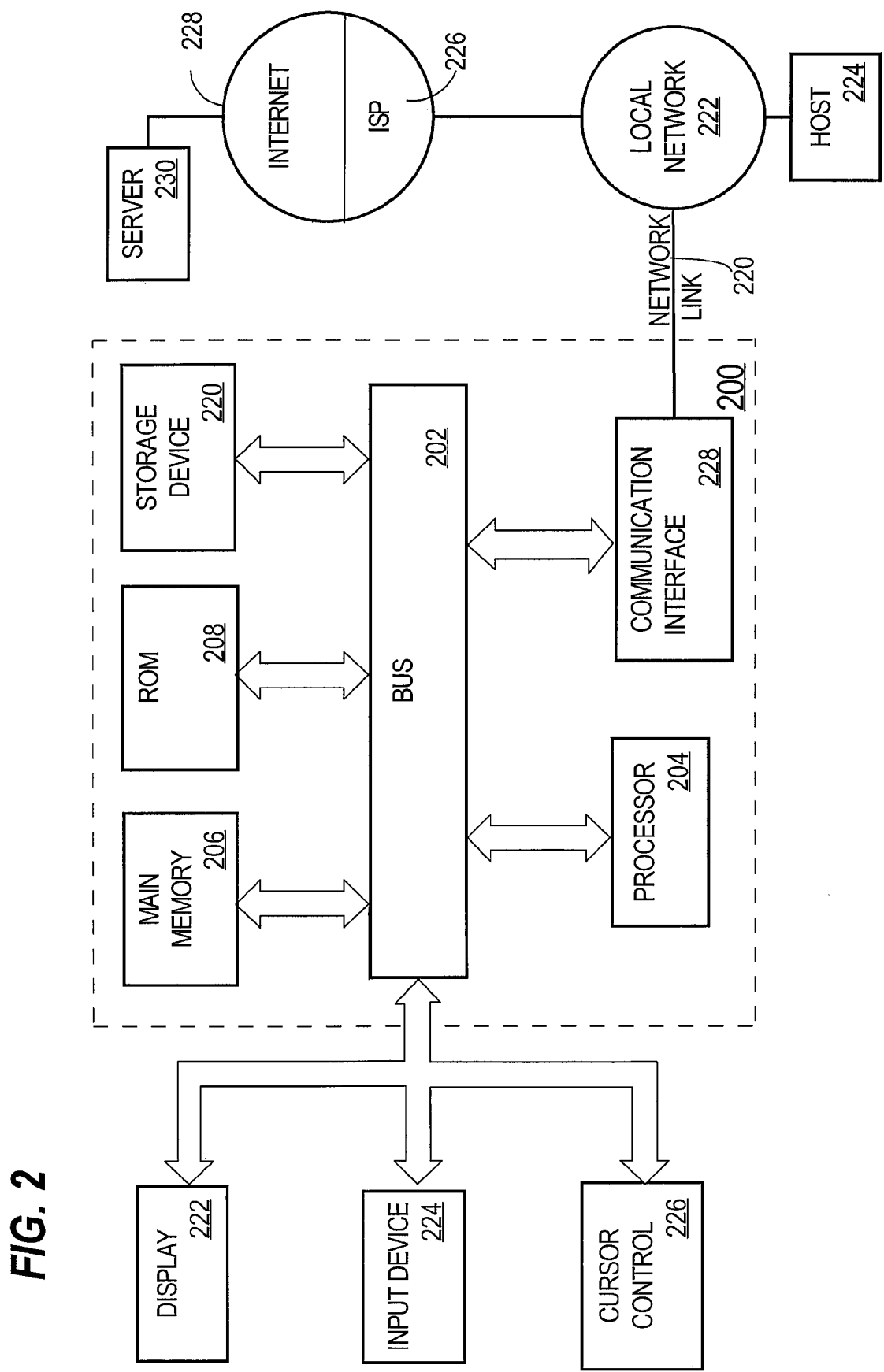
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing database statements, the method comprising:
receiving, by a database server, a first database statement that specifies a modification to metadata of a database object, wherein the first database statement is included in a first database transaction;

wherein a second database transaction, that is different than the first database transaction and that includes one or more data manipulation language (DML) statements, holds a certain lock on the database object when the first database statement is received;

in response to receiving the first database statement, and before acquiring, on the metadata, any lock that is required by the first database statement, the database server, as part of the first database transaction:
  generating a second database statement which, when executed, causes a particular lock to be acquired on the database object, and
  executing the second database statement, wherein executing the second database statement comprises:
    the second database statement waiting for the second database transaction to release the certain lock, and
    the second database statement acquiring the particular lock on the database object only after the second database transaction releases the certain lock;

while the particular lock is acquired for the second database statement, the database server executing the first database statement, which causes a first lock to be acquired on the metadata; and after the first lock is acquired on the metadata and while the metadata is locked with the first lock, modifying the metadata according to the first database statement;

wherein the method is performed by one or more computing devices.

2. The method of claim 1, wherein the first lock is acquired in an exclusive mode.

3. The method of claim 1, wherein the particular lock is acquired in an exclusive mode.

4. The method of claim 1, wherein, as a result of executing the second database statement, a second lock is acquired on the metadata before the particular lock is acquired on the database object.

5. The method of claim 4, wherein the second lock is acquired in a shared mode.

6. The method of claim 4, wherein the particular lock is acquired after the second lock is released.

7. The method of claim 1, wherein after acquiring the first lock on the metadata and before modifying the metadata according to the first database statement, the method further comprising requesting a second lock on the database object.

8. The method of claim 1, wherein the database object is one of a table or an index.

9. The method of claim 1, wherein the second database statement, when executed, mimics a data manipulation language (DML) statement without modifying data stored in the database object.

10. A machine-readable storage medium storing instructions for processing database statements, wherein the instructions, when executed by one or more processors, cause:
  receiving, by a database server, a first database statement that specifies a modification to metadata of a database object, wherein the first database statement is included in a first database transaction;

wherein a second database transaction, that is different than the first database transaction and that includes one or more data manipulation language (DML) statements, holds a certain lock on the database object when the first database statement is received;

in response to receiving the first database statement, and before acquiring, on the metadata, any lock that is required by the first database statement, the database server, as part of the first database transaction:
  generating a second database statement which, when executed, causes a particular lock to be acquired on the database object, and
  executing the second database statement, wherein executing the second database statement comprises:
    the second database statement waiting for the second database transaction to release the certain lock, and
    the second database statement acquiring the particular lock on the database object only after the second database transaction releases the certain lock;

while the particular lock is acquired for the second database statement, the database server executing the first database statement, which causes a first lock to be acquired on the metadata; and after the first lock is acquired on the metadata and while the metadata is locked with the first lock, modifying the metadata according to the first database statement.

11. The machine-readable storage medium of claim 10, wherein the first lock is acquired in an exclusive mode.

12. The machine-readable storage medium of claim 10, wherein the particular lock is acquired in an exclusive mode.

13. The machine-readable storage medium of claim 10, wherein, as a result of executing the second database statement, a second lock is acquired on the metadata before the particular lock is acquired on the database object.

14. The machine-readable storage medium of claim 13, wherein the second lock is acquired in a shared mode.

15. The machine-readable storage medium of claim 13, wherein the particular lock is acquired after the second lock is released.

16. The machine-readable storage medium of claim 10, wherein after acquiring the first lock on the metadata and before modifying the metadata according to the first database statement, the instructions include instructions which, when executed, further cause requesting a second lock on the database object.

17. The machine-readable storage medium of claim 10, wherein the database object is one of a table or an index.

18. The machine-readable storage medium of claim 10, wherein the second database statement, when executed, mimics a data manipulation language (DML) statement without modifying data stored in the database object.

* * * * *